United States Patent [19]

Kruck et al.

[11] Patent Number: 4,917,256
[45] Date of Patent: Apr. 17, 1990

[54] INTERLOCKING AND SEALING ARRANGEMENT FOR MODULAR DOMESTIC APPLIANCES

[75] Inventors: Richard W. Kruck, Sodus Township, Berrien County; Kevin S. Laundroche, Detroit, both of Mich.; Ralph R. Burin, Milton Township, DuPage County, Ill.

[73] Assignee: Whirlpool Corporation, Benton Harbor, Mich.

[21] Appl. No.: 217,990

[22] Filed: Jul. 12, 1988

[51] Int. Cl.$^4$ .............................................. B65D 6/24
[52] U.S. Cl. .................................. 220/4 F; 206/545; 220/3.1
[58] Field of Search .................... 220/4 F, 412, 3.1; 206/545; 62/298, 371, 457

[56] References Cited

U.S. PATENT DOCUMENTS

| | | |
|---|---|---|
| 409,893 | 8/1989 | Wray . |
| 419,920 | 1/1890 | Campbell . |
| 582,005 | 5/1897 | Beerling . |
| 1,383,235 | 6/1921 | Reed . |
| 1,534,468 | 4/1925 | Shea . |
| 1,972,631 | 9/1934 | O'Connell . |
| 2,019,137 | 10/1935 | Johnston . |
| 2,060,756 | 11/1936 | Forsthoefel . |
| 2,105,751 | 1/1938 | Money . |
| 2,127,111 | 8/1938 | Gaenzle . |
| 2,154,242 | 4/1939 | Kucher . |
| 2,165,480 | 7/1939 | Hastings . |
| 2,317,296 | 4/1943 | Nofzinger . |
| 2,328,130 | 8/1943 | Earle . |
| 2,328,189 | 8/1943 | Brace et al. . |
| 2,445,988 | 7/1948 | Ayers . |
| 2,462,115 | 2/1949 | Luecke . |
| 2,496,184 | 1/1950 | Von Canon . |
| 2,502,581 | 4/1950 | Morrison . |
| 2,507,379 | 5/1950 | Morrison . |
| 2,509,011 | 5/1950 | Moore . |
| 2,509,614 | 5/1950 | Philipp . |
| 2,509,615 | 5/1950 | Philipp . |
| 2,509,779 | 5/1950 | Morrison . |
| 2,521,064 | 9/1950 | Kleist . |
| 2,535,682 | 12/1950 | Jones . |
| 2,584,089 | 1/1952 | Hillenbrand et al. . |
| 2,605,617 | 8/1952 | Replogle . |
| 2,671,603 | 3/1954 | Bauer . |

(List continued on next page.)

FOREIGN PATENT DOCUMENTS 1180303 10/1964 Fed. Rep. of Germany .......... 220/4

Primary Examiner—Stephen M. Hepperle
Attorney, Agent, or Firm—Mason, Kolehmainen, Rathburn & Wyss

[57] ABSTRACT

A domestic or household appliance is provided which includes a plurality of side panels and a base panel, each of the panels having cooperating integral interlocking means in the edges thereof so that the panels may be manufactured at one location and shipped in knockdown form to another location. The side panels may then be readily assembled on the base panel by unskilled personnel without the use of tools or separate fastening means by simple engagement of the interlocking means in the panel edges. This interlocking means includes a plurality of elongated slots in the base panel which extend inwardly and downwardly at an angle to the vertical and projecting tongues in the bottom edges of the side panels which extend at a similar angle to the vertical and are adapted to be inserted into the slots by movement of the side panel along the angle to the vertical. Cooperating interlocking shoulders on the base panel and the side panels are engaged as the tongues are inserted into the slots. Adjacent vertical edges of the side panels are also provided with cooperating tongue and groove means which extend inwardly and downwardly at the angle to the vertical and facilitate insertion of the tongues of the end panels into the slots in the front and rear panels. The adjacent vertical edges of the side panels also have cooperating interlocking shoulders which are engaged as the end panels are assembled on the front and rear panels.

40 Claims, 11 Drawing Sheets

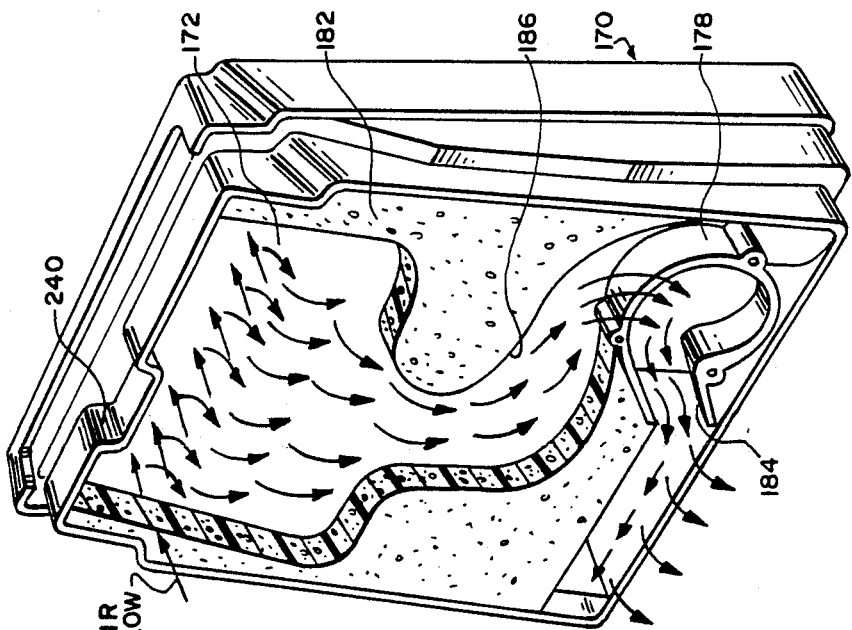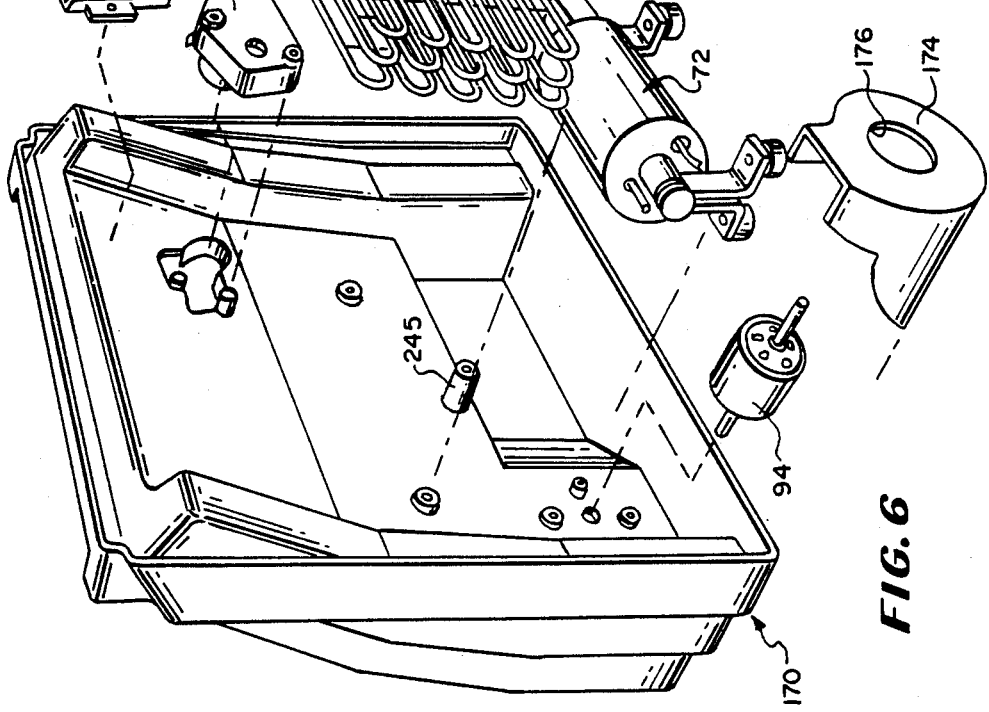

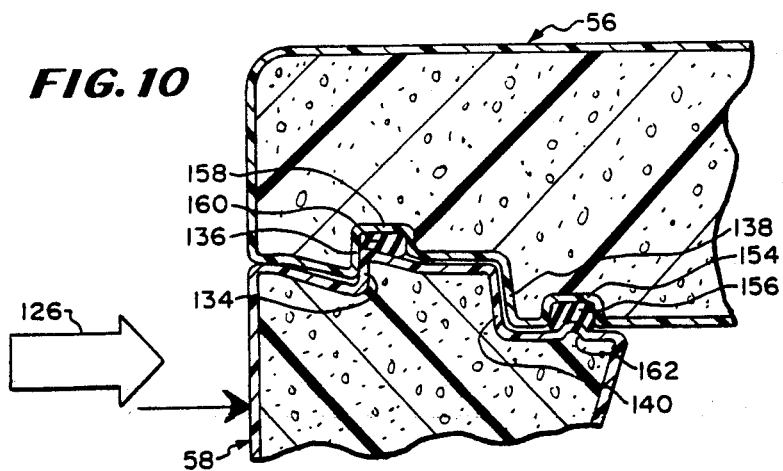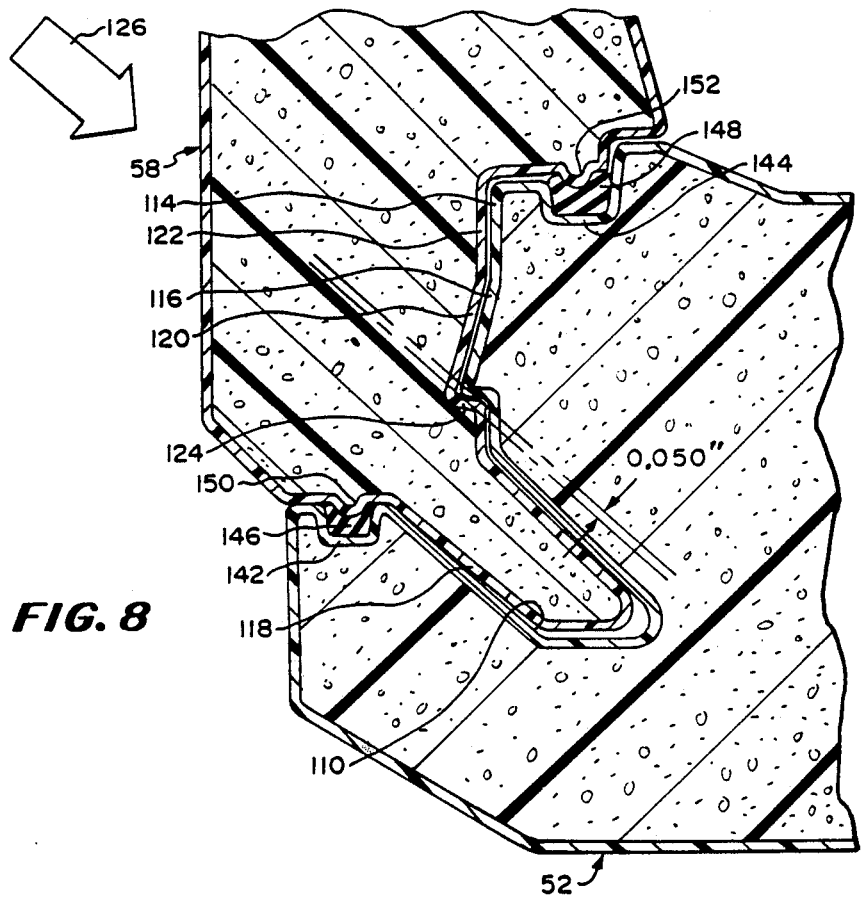

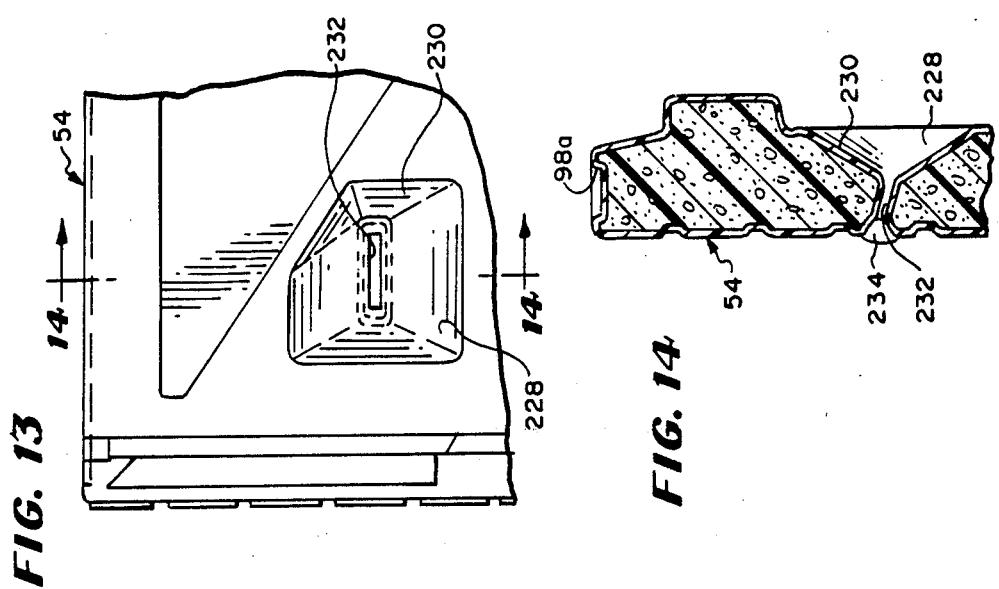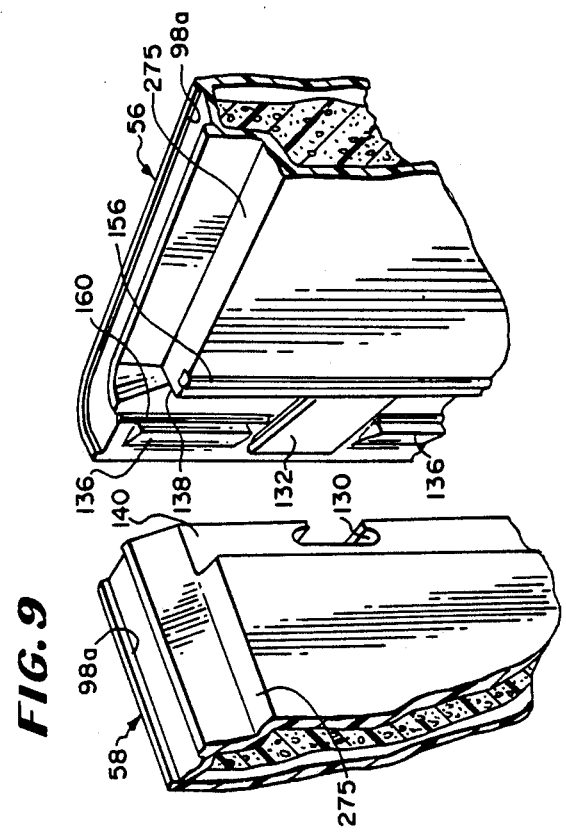

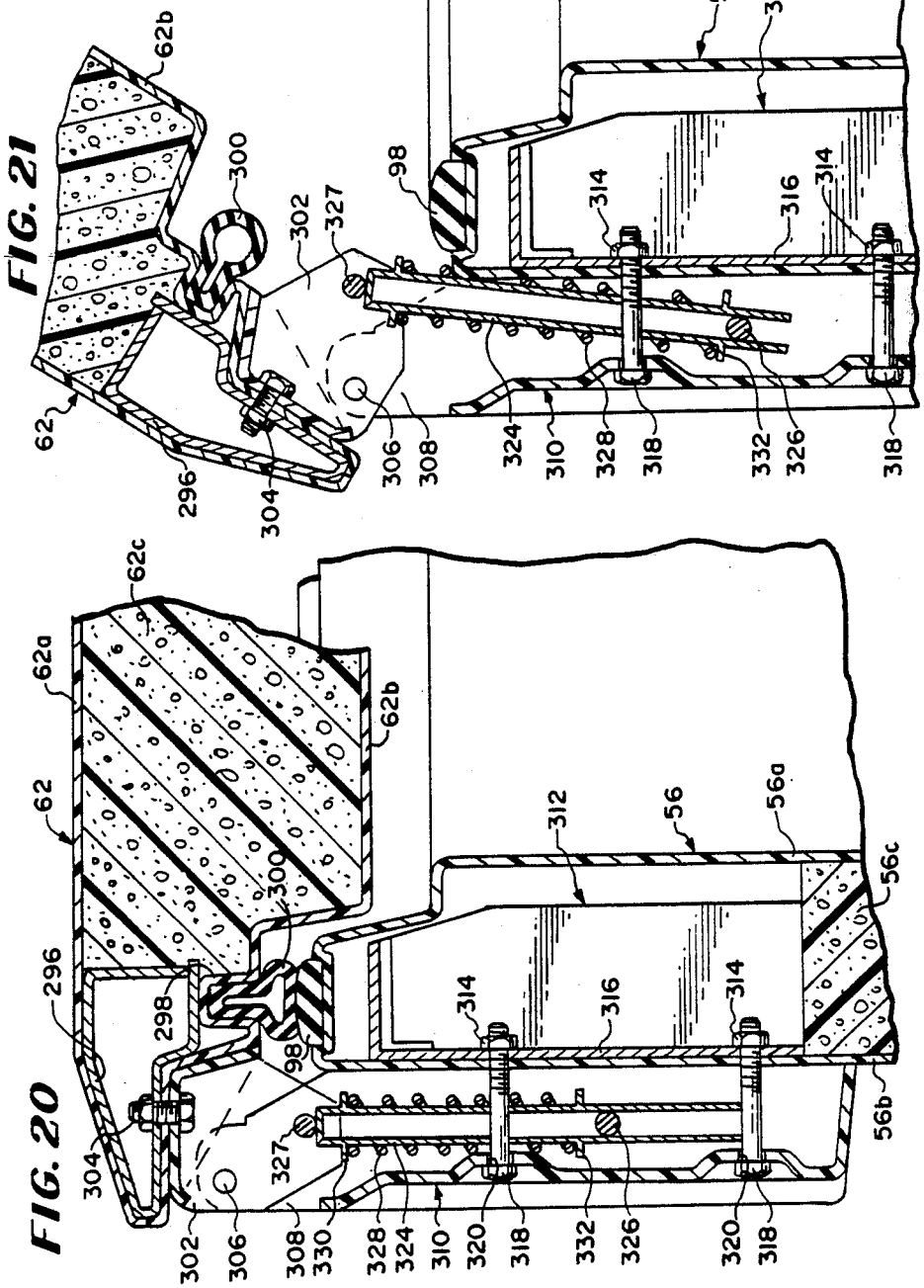

INTERLOCKING AND SEALING ARRANGEMENT FOR MODULAR DOMESTIC APPLIANCES

BACKGROUND OF THE INVENTION

A. Field of the Invention

The present invention relates generally to domestic appliances, such as refrigeration appliances of the demountable or so-called knockdown type which can be shipped as separate panels or modules to a desired location and then assembled into the final domestic appliance. Specifically, the invention is directed to an interlocking and sealing arrangement for such panels which permits ready assembly thereof by unskilled personnel without the use of separate fastening means.

B. Description of the Prior Art

A number of arrangements have been heretofore proposed, both in the refrigeration art and elsewhere, wherein a demountable or knockdown construction is employed so that the appliance may be shipped disassembled to a desired location and then assembled into a desired finished product. Arrangements of this type in the refrigeration art are exemplified by U.S. Pat. Nos. 2,127,111; 2,502,581; 2,507,379; 2,509,779; 2,521,064; 2,535,682; 3,392,497 and 4,358,213.

All of the above arrangements are quite complicated in construction and are not particularly suitable for use in the domestic appliance field when assembly by the ultimate customer is contemplated. Furthermore, these refrigeration arrangements typically require the use of tools and/or separate fastening and sealing means, which adds to the complexity of such arrangements and renders them more difficult to assemble by unskilled personnel.

A number of other arrangements outside the refrigeration field have employed various types of interlocking joints for demountable furniture, and the like. However, these arrangements are again quite complicated, usually require a multiplicity of small parts and separate fastening means, and are not particularly suitable for use in the domestic appliance field, particularly when assembly by the ultimate customer is contemplated. Examples of such demountable constructions outside the refrigeration art are shown in U.S. Pat. Nos. 305,286; 409,893; 419,920; 582,005; 1,534,468; 2,496,184; 3,565,903; 3,674,328; 3,722,157; 3,995,922; 4,019,298; 4,127,353 and 4,408,812.

SUMMARY OF THE INVENTION

An object of the present invention is to provide a new and improved knockdown domestic appliance which comprises a plurality of side panels and a base panel, the base panel and the side panels having cooperating integral interlocking means in the edges thereof so that the side panels may be readily assembled to the base panel and to each other by engagement of the interlocking means in the panel edges without the use of tools or separate fastening means.

Another object of the present invention is to provide a new and improved knockdown refrigeration appliance comprising a plurality of side panels and a base panel, each of the panels comprising inner and outer sheets of plastic material separated by a layer of insulating material and each having cooperating integral interlocking means in the edges thereof so that the side panels may be readily assembled to the base panel and to each other by engagement of the interlocking means in the panel edges without the use of tools or separate fastening means.

Another object of the present invention is to provide a new and improved knockdown domestic appliance wherein the interlocking means includes elongated slots in the base panel which extend inwardly and downwardly therein at an angle to the vertical and projecting tongues in the bottom edges of the side panels which extend into the slots.

A further object of the present invention resides in the provision of a knockdown appliance wherein the interlocking means also includes cooperating interlocking shoulders on the side panels and the base panel which are engaged as the tongues are inserted into the slots.

Another object of the present invention is to provide a knockdown appliance which includes gaskets mounted in the upper surface of the base panel and positioned on either side of the elongated slots, the gaskets being engaged by the bottom edges of the side panels as the tongues are inserted into the slots to provide dual seals between the base panel and the side panels.

Briefly, the present invention provides a new and improved domestic appliance of modular construction which includes a plurality of side panels and a base panel, each of the panels having cooperating integral interlocking means in the edges thereof so that the panels may be manufactured at one location and shipped in knockdown form to another location. The side panels may be readily assembled on the base panel by unskilled personnel without the use of tools or separate fastening means by simple engagement of the interlocking means in the panel edges. This interlocking means includes a plurality of elongated slots in the base panel which extend inwardly and downwardly at an angle to the vertical and projecting tongues in the bottom edges of the side panels which extend at a similar angle to the vertical and are adapted to be inserted into the slots by movement of the side panel along the angle to the vertical. Cooperating interlocking shoulders on the base panel and the side panels are engaged as the tongues are inserted into the slots. Adjacent vertical edges of the side panels are also provided with cooperating tongue and groove means which extend inwardly and downwardly at the angle to the vertical and facilitate insertion of the tongues of the end panels into the slots in the front and rear panels. The adjacent vertical edges of the side panels also have cooperating interlocking shoulders which are engaged as the end panels are assembled on the front and rear panels.

In accordance with a further feature of the invention, the base panel and side panels are all formed by a twin sheet thermoforming process to provide a knockdown refrigeration appliance. Thus, each panel comprises inner and outer sheets of plastic material which are sealed at the edges and separated by a layer of insulating material, the inner and outer sheets being die-formed to provide the interlocking means in a single manufacturing operation. The knockdown refrigeration appliance also preferably includes dual sealing gaskets positioned on either side of the slots in the base panel to provide a thermally efficient seal between the base panel and the side panels. Also, the knockdown refrigeration appliance includes dual sealing gaskets on the vertical edges of front and rear panels to provide a thermally efficient seal between adjacent vertical edges of the side panels.

BRIEF DESCRIPTION OF THE DRAWING

The above and other objects, advantages and novel features of the present invention will become apparent from the following detailed description of a preferred embodiment of the invention illustrated in the accompanying drawing, wherein:

FIG. 3A is a circuit diagram of a lid closure detecting arrangement employed in the freezer of FIG. 1;

FIG. 3B is a circuit diagram of an alternative lid closure detecting arrangement which employs a vacuum controlled switch;

FIG. 6 is an exploded perspective view of the sealed unit of FIG. 5 showing the other side of the unit;

FIG. 7 is a fragmentary perspective view of the unit of FIG. 5 and illustrating the air flow path in the evaporator section of the unit;

FIG. 8 is a sectional view taken along the line 8—8 of FIG. 1 and shown on an enlarged scale;

FIG. 9 is a fragmentary perspective view of the interlocking and sealing arrangement employed in the side panels of the freezer of FIG. 1;

FIG. 10 is a sectional view taken along the line 10—10 of FIG. 1;

FIG. 13 is a fragmentary rear view of the front panel of the freezer of FIG. 1 showing the upper left hand corner of the rear side of said front panel;

FIG. 14 is a sectional view taken along the line 14—14 of FIG. 13;

FIG. 20 is a sectional view taken on an enlarged scale along the line 20—20 of FIG. 2 and showing the lid hinge arrangement of the freezer of FIG. 1; and FIG. 21 is a sectional view similar to FIG. 20 but shows the lid in a raised position.

DESCRIPTION OF THE PREFERRED EMBODIMENT

General Description

Figure 1:
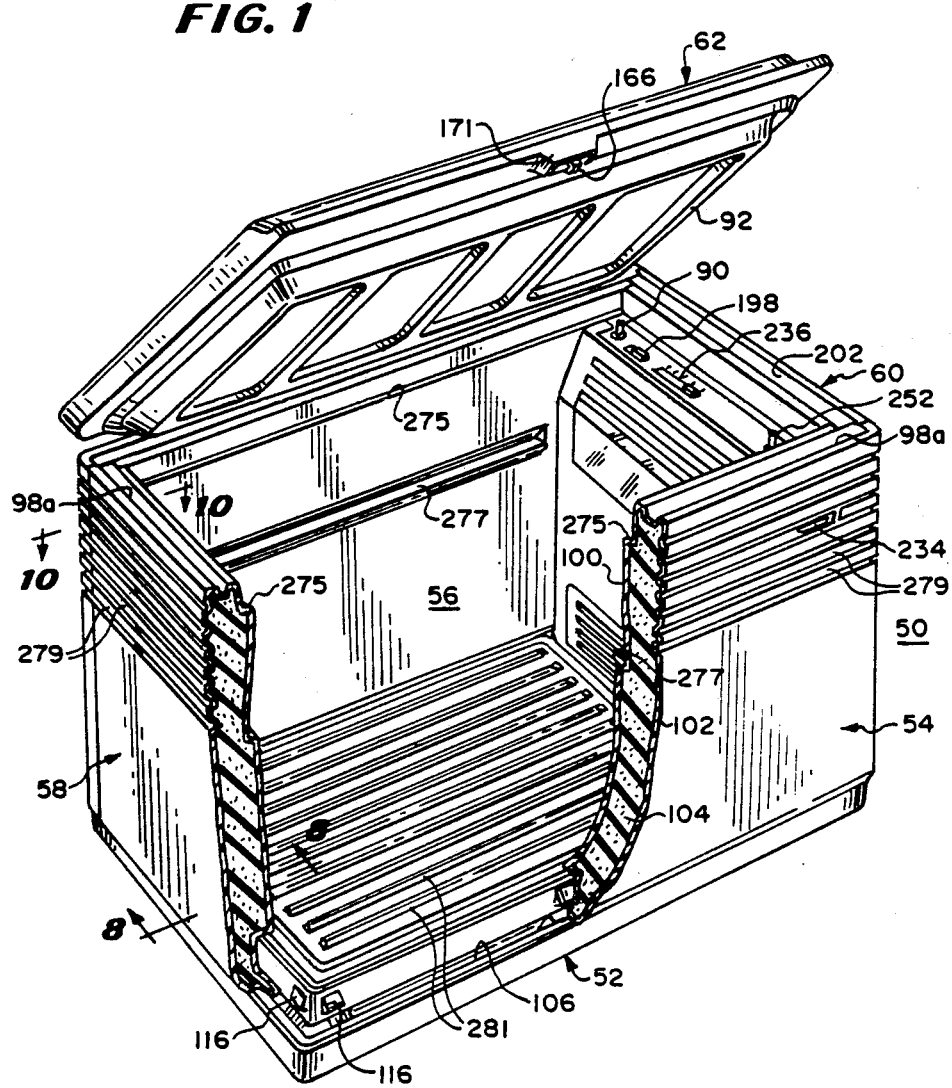
FIG. 1 is a frontal perspective view of a knockdown chest freezer embodying features of the present invention and shown with portions of the front and left-hand side panels broken away.
Figure 2:
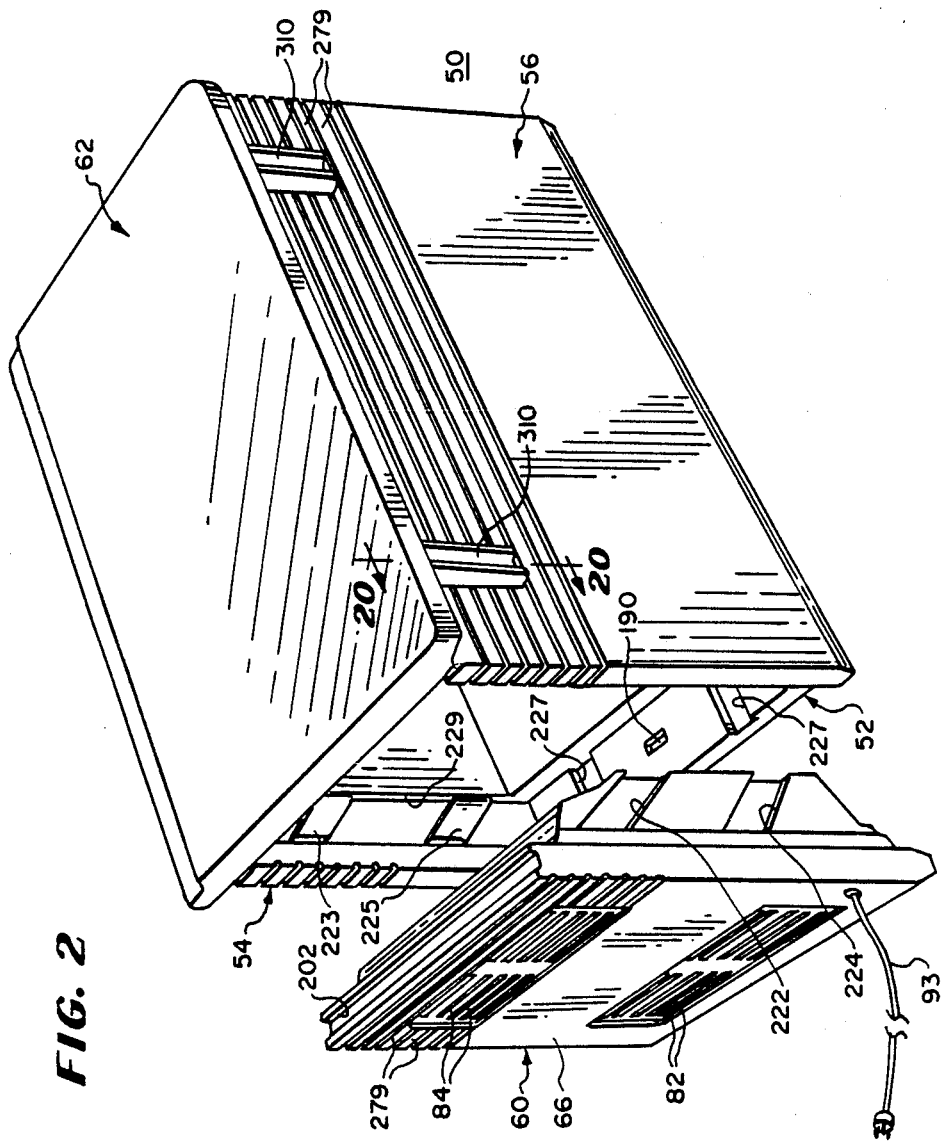
FIG. 2 is a rear perspective view of the chest freezer of FIG. 1 shown with the lid closed and with the right-hand side panel, which contains a complete mechanical refrigeration unit, disassociated from the remainder of the freezer.
Figure 3:
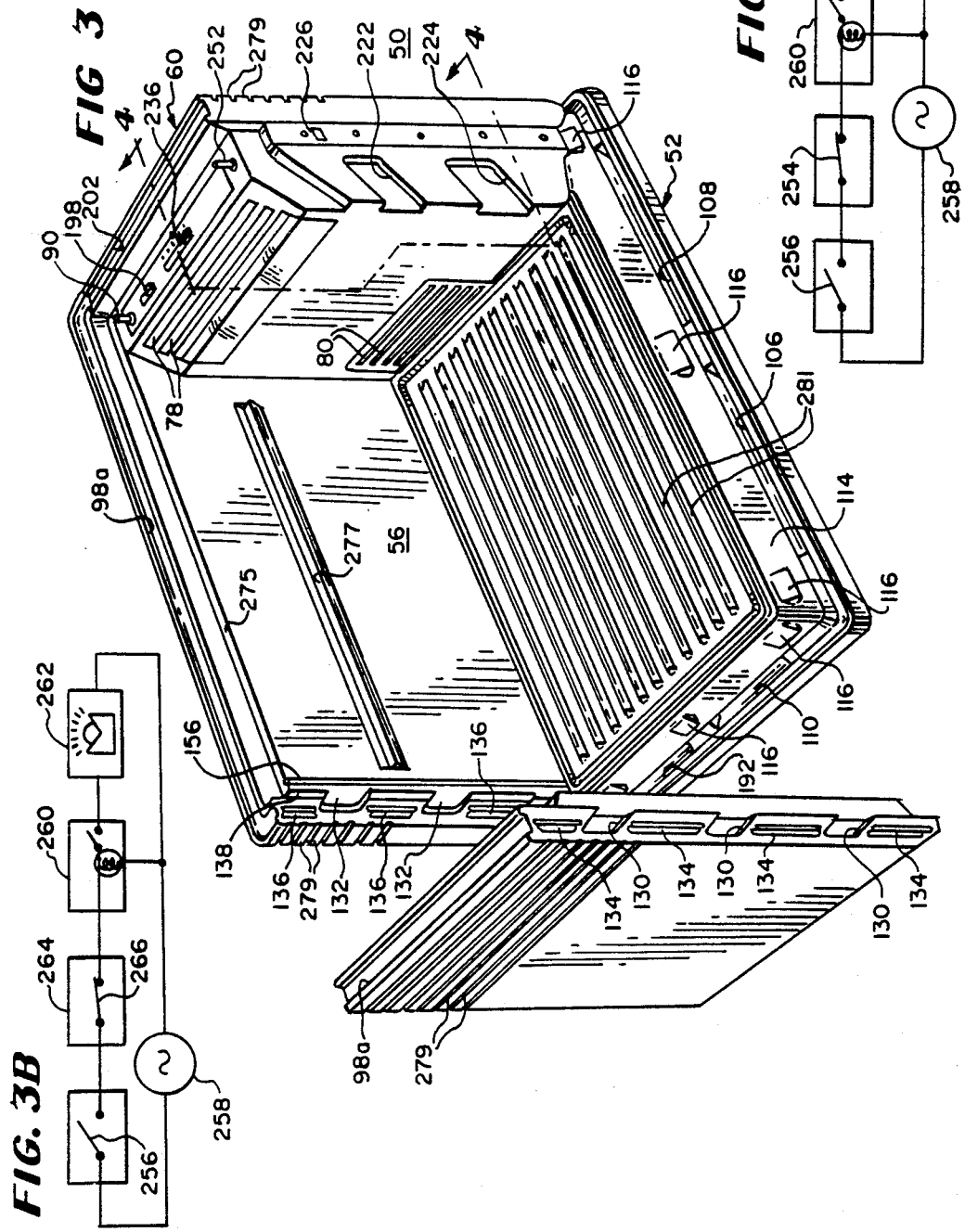
FIG. 3 is a frontal perspective view of the freezer, similar to FIG. 1 but shown without the front panel and lid, and with the left-hand side panel removed from the base and rear panels.

Referring now to the drawing and initially to FIGS. 1, 2 and 3 thereof, the features of the present invention are disclosed in a chest freezer indicated generally at 50.

In accordance with an important aspect of the disclosed arrangement, the freezer 50 is of demountable or knockdown construction so that the individual modules or panels thereof may be shipped disassembled to a desired location and then assembled into a finished freezer by unskilled personnel, including the ultimate customer, without the use of special tools or separate retaining means. More particularly, the freezer 50 includes a base panel indicated generally at 52, a front panel indicated generally at 54, a rear panel indicated generally at 56, a left-hand end panel indicated generally at 58 and a right-hand end panel indicated generally at 60. The base panel 52 and the side panels 54-60 are provided with integral interlocking surfaces in the edges thereof, which will be described in more detail hereinafter, so that the side panels 54-60 may be readily assembled on the base panel 52 by simple engagement of these interlocking surfaces in the panel edges. More particularly, the front and rear panels 54 and 56 are first mounted on the base panel 52 and the side panels 58 and 60 are then interfitted with the ends of the front and rear panels 54, 56 and the base panel 52. A lid or closure member indicated generally at 62 may then be secured to the rear panel 56, as described in detail hereinafter, to provide a completely enclosed refrigerated compartment.

In accordance with an important aspect of the disclosed arrangement the right-hand side or end panel 60 is relatively thin and is of relatively light weight and yet contains all of the electrical, mechanical, and control components of the freezer 50 so that no hook-up or connections of any kind are required in assembling the freezer 50. More particularly, the right-hand side or end panel 60 contains within an inner wall 64 and an outer wall 66 (FIG. 4) thereof a complete mechanical refrigeration unit which includes an evaporator indicated generally at 68, a condenser indicated generally at 70 and a motor driven compressor indicated generally at 72 (FIG. 6) all of which are interconnected in a sealed refrigerant system. The right-hand side panel 60 also contains motor driven fans 74 and 76 for the evaporator 68 and condenser 70, respectively. The evaporator fan 74 is arranged to pull air from the interior of the freezer inwardly through the upper openings or louvers 78 in the inner wall 64, over the evaporator 68 so that the air is cooled and exhausts the cooled air into the interior of the freezer 50 through the lower openings 80 in the side wall 64 of the panel 60. The condenser fan 64 draws outside air inwardly through the openings 82 in the outer wall 66 and directs this air upwardly over the condenser 70 to cool the condenser 70, the heated air being exhausted through the upper openings 84 in the outer wall 66.

In order to seal the lid 62 to the upper edges of the panels 54-60 when the lid 62 is closed, a continuous gasket 98 (FIG. 21) is placed in grooves 98a formed in the upper edges of the panels 54, 56 and 58 and the groove 202 in the upper edge of the panel 60. The gasket 98 is engaged by a gasket 300 (FIG. 21) provided in the lid 62 so that the freezer compartment is tightly sealed when the lid 62 is closed.

In order to provide an access light which illuminates the interior of the freezer 50 when the lid 62 is open, the inner wall 64 of the panel 60 includes a translucent panel portion 86 behind which is positioned a light source 88. The light source 88 is controlled by a plunger type switch 90 (FIG. 3) which is mounted in the top wall of the panel 60 and is arranged to be controlled by a downwardly extending ridge 92 (FIG. 1) formed in the undersurface of the lid 62. When the lid 62 is opened, the ridge 92 releases the plunger switch 90 so that the light 88 is energized to provide illumination for the interior of the freezer 50. A power cord 93 extends outwardly from the outside wall and supplies electrical power to a fan motor 94 (FIG. 4), which drives the fans 74, 76 and the motor for the rotary compressor 72.

From this brief general description of the freezer 50 it will be seen that assembly of this freezer may be accomplished by relatively unskilled personnel and requires only the mounting of the side panels 54-60 on the base panel 52, mounting of the lid 62 on the rear wall 56 and plugging in the power cord 93 to provide an operative chest freezer.

Interlocking Surfaces And Seals Of Freezer 50

Before considering in detail the interlocking surfaces and seals provided in the disclosed arrangement to facilitate assembly of the modular panels of the freezer 50 to provide a tightly sealed freezer compartment, it should first be pointed out that in accordance with an important aspect of the disclosed arrangement the base 52, side panels 54-58 and lid 62 are all preferably formed by a twin sheet thermoforming process, described in more detail hereinafter, which permits the inclusion of intricate die formed ridges, troughs, grooves and shoulders in these panels so that accurately positioned interlocking surfaces and shoulders may be provided in the edges of these panels to permit ready assembly thereof without the use of special tools or fastening means. Considered very generally this twin sheet thermoforming process provides a panel, such as the front panel 54 having inner and outer walls 100 and 102 of sheet plastic which are die formed to the desired configuration and sealed together at the edges to form a hollow panel the interior of which is filled with an insulating material 104.

Considering first the manner in which the side panels 54-60 are assembled on the base panel 52, the base panel 52 is provided with elongated slots in the edges thereof, such as the elongated slots 106, 108 beneath the front panel 54 and the slots 110 and 112 beneath the left hand panel 58, these slots extending inwardly ie., in a direction toward the interior of the freezer, and downwardly at an angle to the vertical, as best illustrated in FIG. 8. The base panel 52 is also provided with an inwardly i.e., in a direction toward the interior of the freezer, offset vertically extending wall portion 114 in which are formed outwardly extending projections 116 which are positioned beyond the slots 106, 108 on the base panel 52, the bottom edges of the projections 116 forming interference shoulders which interlock with corresponding shoulders on the side panels to hold these panels tightly in place. More particularly, the side panels, such as the left-hand side panel 58 are formed with inwardly and downwardly extending tongue or locating tab portions 118 (FIG. 8) which are adapted to be inserted into the elongated slots 110, 112 in the base panel 52 to provide an accurately located interlocking arrangement between the side panels and the base panel. The side panels are also provided with recesses 120 in the inner vertical wall portion 122 thereof (FIG. 8), the recesses 120 defining interference shoulders 124 which are adapted to be engaged by and interlock with the projections 116 on the base panel 52. In this connection, it should be understood that the side panels, such as the side panel 58, are inserted into the base panel 52 by movement parallel to the elongated slots 110, 112, i.e., by movement along the direction of the arrow 126 shown in FIG. 8. Thus, the shoulders 124 are snapped into place behind the bottom edges of the projections 116 on the base panel 52 so that the side panel 58 is securely mounted on the base panel 52 without the use of special tools or separate retaining means. Preferably, the shoulders 124 and projections 116 have an interference overlap of approximately 0.050 inches, as illustrated in FIG. 8, to hold the side panels securely on the base panel 52. In this connection, it should be pointed out that the interference shoulders 116, 124 are shown for illustrative purposes only in solid lines in FIG. 8. These shoulders are actually positioned between the elongated slots 110 and 112 in the base member 52.

In order to interlock the adjacent edges of the side panels 54-60, the end panels, such as the end panel 58, are provided with a series of grooves 130 (FIG. 3) of any desired number in the vertical edge walls thereof which are adapted to receive corresponding tongues 132 formed in the corresponding edges of the front and rear panels 54 and 56. The grooves 130 and tongues 132 extend downwardly at an angle which is parallel to the elongated slots 110, 112 in the base panel 52. Accordingly, when the grooves 130 are fitted over the tongues 132 the locating tabs 118 are oriented at the right angle to be inserted into the elongated slots 110, 112 of the base panel 52. Thus, movement of the end panel 58 along the line 126 in FIG. 8 causes engagement of the tongue and groove interlocking means 130, 132 and at the same time the locating tabs 118 are inserted into the slots 110, 112 and the interference shoulders 124 are locked beneath the projections 116.

In order to tightly interlock the adjacent edges of adjacent side panels, an interference locking shoulder arrangement is also provided in these edges. More particularly, a series of vertically extending shoulders 134 are provided in the vertical edges of the end panel 58 intermediate the grooves 130 (FIGS. 3 and 10), the shoulders 134 being adapted to engage with cooperating vertically extending shoulders 136 (FIGS. 3 and 10) provided in the corresponding edge of the rear panel 56, and the front panel 54. Accordingly, as the grooves 130 are inserted over the tongues 132 in the rear panel 56, the shoulders 134 snap behind the shoulders 136 on the rear panel 56 and hold the side panel 58 securely connected to the adjacent edges of the front and rear panels throughout the length thereof.

In order to limit the inward movement of the side panel 58, as it is inserted on the base panel 52 and engaged with the front and rear panels 54 and 56, the front and rear panels 54 and 56 are provided with vertically extending limit shoulders 138 which cooperate with corresponding shoulders 140 (FIGS. 9 and 10) on the end panel 58 to limit inward movement of the end panel 58 as it is being mounted on the base panel 52 by movement in the direction of the arrow 126 in FIGS. 8 and 10.

In accordance with a further important aspect of the disclosed arrangement a dual sealing system is provided between the base panel 52 and the side panels and between adjacent edges of adjacent side panels to prevent a loss of cooling within the refrigerated compartment and to block solid and liquid debris from the panel interfaces. Referring first to the dual sealing arrangement provided between the base panel 52 and the side panels, such as the end panel 58, and referring particularly to FIG. 8, a first top opening trough 142 is provided in the outer edge of the base member 52 and a similar top opening trough 144 is provided in the outer edge of the inwardly offset portion 114 of the base member 52. The trough 142 is filled with gasket material 146 and the trough 144 is filled with gasket material 148. The gasket material 146 and 148 may be foamed in place at the time the base panel 52 is formed and filled with insulating material. Thus, the gasket material 146, 148 may comprise either foamed urethane or foamed silicone. In the alternative, the troughs 142, 144 may be filled with a solid gasket material which may comprise either solid silicone, solid vinyl or a solid rubber gasket.

In order to increase the effectiveness of the sealing gaskets 146 and 148, corresponding bottom edges of the side panels, such as the side panel 58, are provided with downwardly extending ridges 150 and 152 which engage with and compress the gasket material 146 and 148, respectively, as the side panel 58 is moved into place on the base panel 52.

In order to provide a similar dual sealing system between the adjacent vertical edges of the side panels, such as the adjacent edges of the side panel 58 and the rear panel 56, a vertically extending trough 154 is provided in the rear panel 56 inside of the limit shoulder 138, the trough 154 being filled with gasket material 156. Also, vertically extending troughs 158 are provided between the tongues 132 in the rear panel 56 and just inside of the locking shoulder 136 on this panel, the troughs 158 being filled with gasket material 160, as best illustrated in FIG. 10. As the side panel 58 is moved into place, the outwardly projecting shoulders 134 on the vertical edges thereof snap behind the corresponding vertically extending locking shoulders 136 of the rear panel 56, the shoulders 134 engaging and compressing the gasket material 160 within the troughs 158, as illustrated in FIG. 10. The vertical edges of the side panel 58 are also provided with vertically extending ridges 162 (FIG. 10) which are positioned inside the limit shoulders 140 on the vertical edges of the panel 58 and engage and compress the gasket material 156 in the troughs 154 when the side panel 58 is moved into place against the limit shoulders 138, 140. The gaskets 154 and 158 may either be foamed in place or comprise solid gasket material, as discussed in detail heretofore in connection with the gaskets 146, 148 on the base panel 52.

Lid Locking Arrangement

Figure 11:
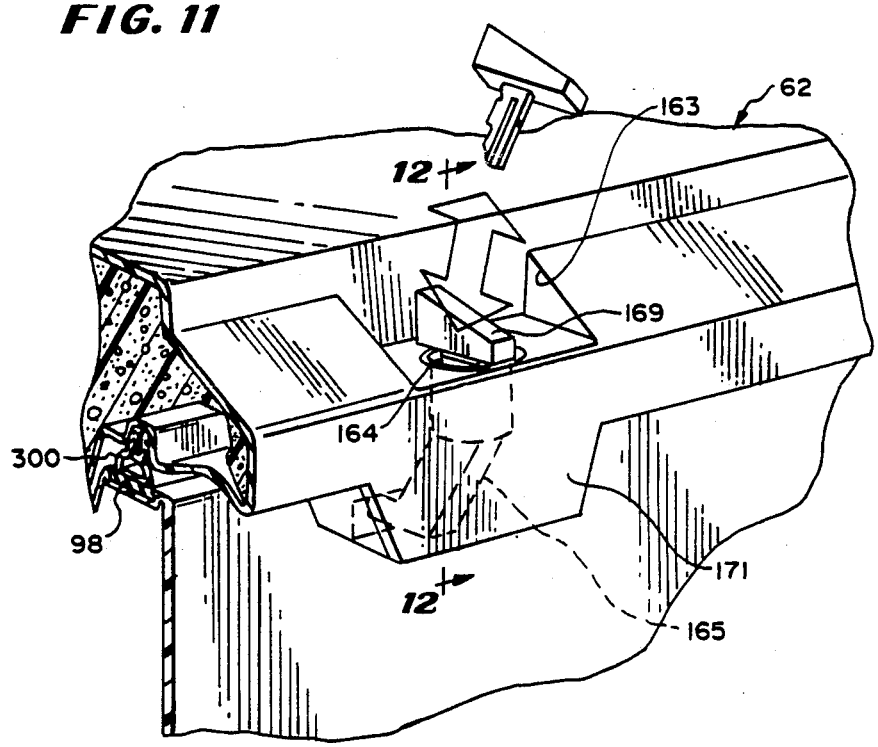
FIG. 11 is a fragmentary perspective view, on an enlarged scale, of the lid locking arrangement employed in the freezer of FIG. 1.
Figure 12:
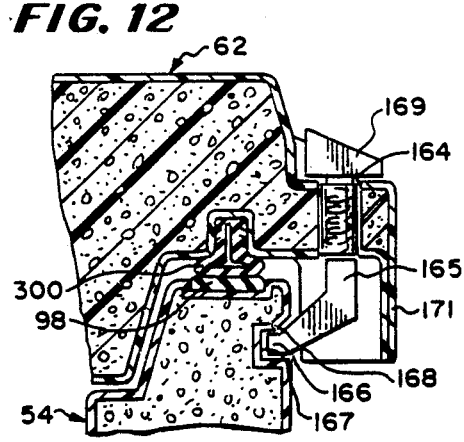
FIG. 12 is a sectional view taken along the line 12—12 of FIG. 11.
Figure 15:
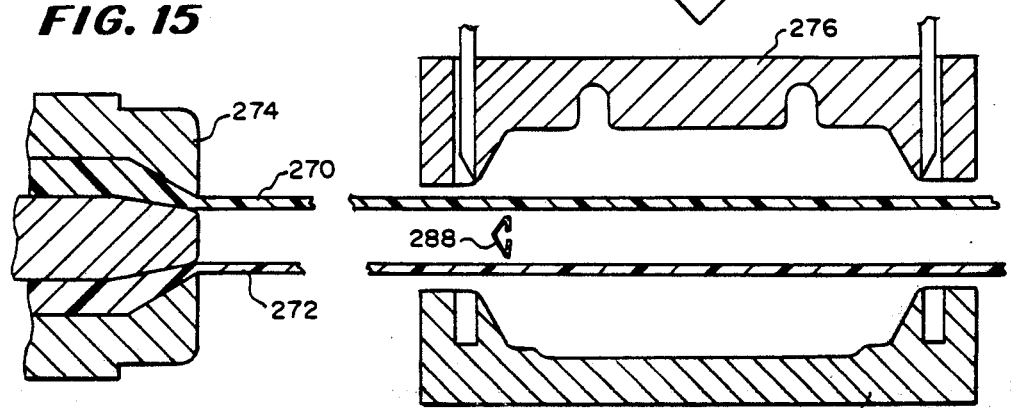
FIGS. 15-19 are diagrammatic illustrations of different steps in the twin sheet thermoforming process employed to manufacture the panels of the freezer of FIG. 1.

In accordance with a further important aspect of the disclosed arrangement, the lid 62 is provided with a locking arrangement whereby the lid 62 may be locked in place after it has been closed without requiring the provision of any holes in the front panel 54 which would reduce the insulation provided thereby. Furthermore, this lid locking arrangement is provided in the lid 62 and the front panel 54 as these panels are shipped to the final destination so that no assembly of parts is required in assembling the freezer 50. Thus, referring to FIGS. 11 and 12, the forward edge of the lid 62 is provided with a recess 163 within which is mounted a vertically extending cylinder type lock 164. A downwardly projecting arm 165 is connected to the rotatable portion of the lock 164, the arm 165 having an offset end portion 166 which moves into a groove 167 formed in the front wall of the front panel 54 when the lock 164 is rotated while the lid 62 is closed. Accordingly, when the arm 165 is moved to the position shown in FIG. 12, the offset end portion 166 thereof is positioned beneath the shoulder 168 formed by the top wall of the groove 157 in the front panel 54 so that the lid 62 is locked in place and cannot be opened. The lock 164 is arranged to receive a key 169. When the key 169 is rotated, the arm 165 is moved out of the groove 167 thus permitting the lid 62 to be opened. It will be noted that the disclosed arrangement does not require any holes through the front panel 54 or in the lid 62 inside of the sealing gasket 300 thereof, so that the insulation of these members is not compromised. Preferably the outer edge of the lid 62 is provided with a downwardly extending bracket portion 171 which covers the rotary arm 165 to prevent injury to the user's fingers when the lid 62 is closed and locked.

Side Wall Panel Containing Mechanical Refrigeration Unit

As discussed generally heretofore, the modular side panel 60 contains all of the electrical components for the sealed mechanical refrigeration system and controls therefor, and yet is relatively thin and of relatively light weight and is particularly suitable for use in the illustrated knockdown or demountable chest freezer wherein the side panels and base panels may be readily assembled to provide a complete refrigeration unit by relatively unskilled personnel. However, it should be pointed out that the modular side panel unit 60 which can be prebuilt, quality checked and then enclosed, may equally well be employed in other types of refrigeration apparatus either of the knockdown or demountable type, or refrigeration apparatus manufactured as a complete unit as original equipment.

Considering now in more detail the modular side panel unit 60, and referring to FIGS. 4 to 7, inclusive, a molded plastic divider wall indicated generally at 170 is positioned between the inner wall 64 and outer wall 66 of the panel 60 and extends generally vertically therebetween. A layer of foam insulation 172 is provided on the inner wall of the divider wall 170 and the evaporator 68 is mounted on the divider wall 170 inside of the insulation layer 172. The condenser 70 is mounted on the outside surface of the divider wall 170 and somewhat below the evaporator 68. A fan shroud 174, which is mounted on the outer surface of the divider panel 170 and surrounds the driving motor 94 and the condenser fan 76 which is of squirrel-cage configuration, is provided with an opening 176 which is in alignment with the lower openings 82 in the outer wall 66 of the panel 60 so that exterior air is sucked into the fan 76 and is directed by means of the shroud 174 upwardly through the coils of the condenser 70. The arrangement also provides some cooling for the compressor 72 which is mounted below the condenser coils 70 (FIG. 6) as the exterior air is forced over the condenser coil 70 and out of the upper openings 84 in the outer wall 66. A fan shroud 178 is also provided for the evaporator fan 74, the shroud 178 being mounted on the inner surface of the divider wall 170 and having a cover 179. The cover 179 has an opening 180 therein so that air which is pulled in through the upper openings 78 of the inner wall 64 and over the evaporator 68, through the opening 180 and into the fan 174, is directed laterally and forced out of the offset lower openings 80 (FIG. 3) in the inner side wall 64 of the panel 60.

Figure 4:
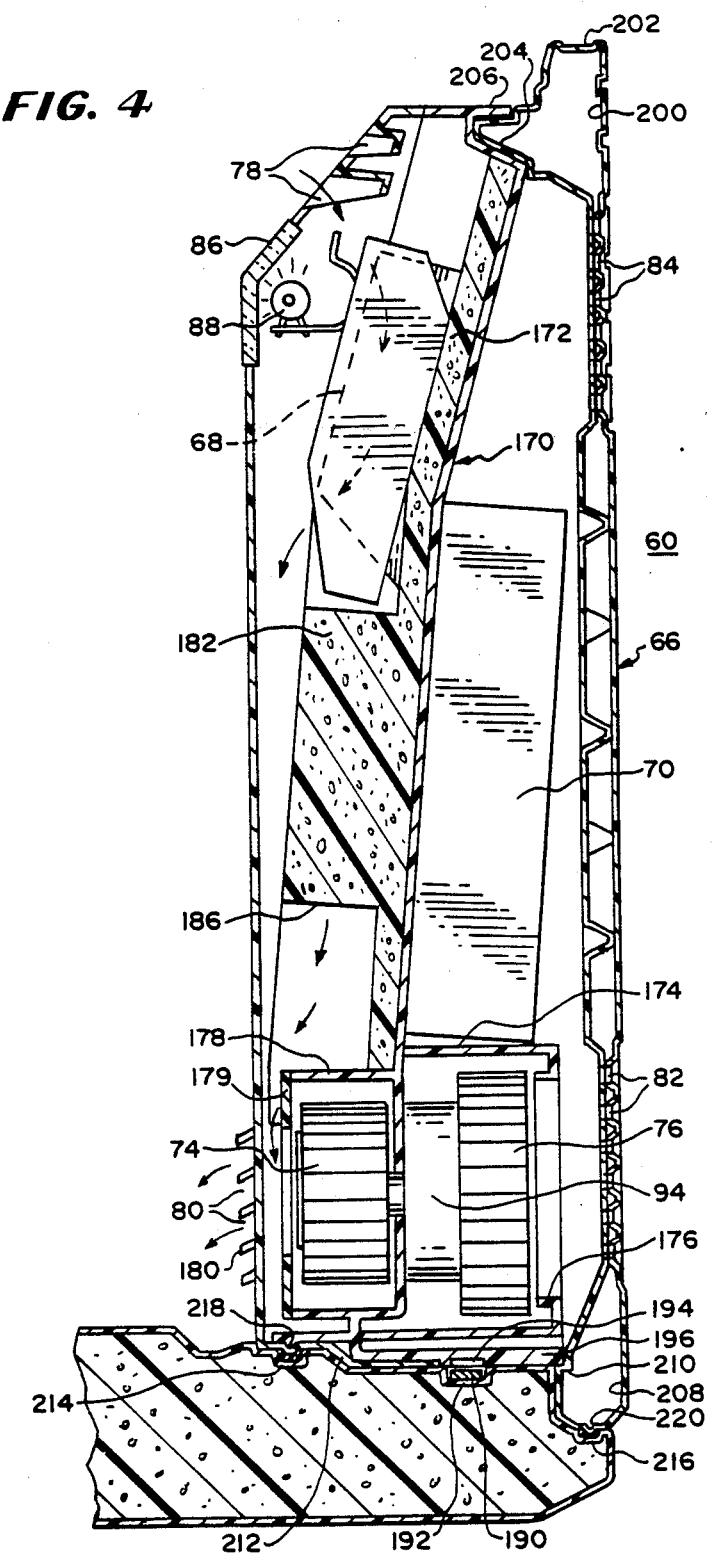
FIG. 4 is a sectional view taken along the line 4—4 of FIG. 3.
Figure 5:
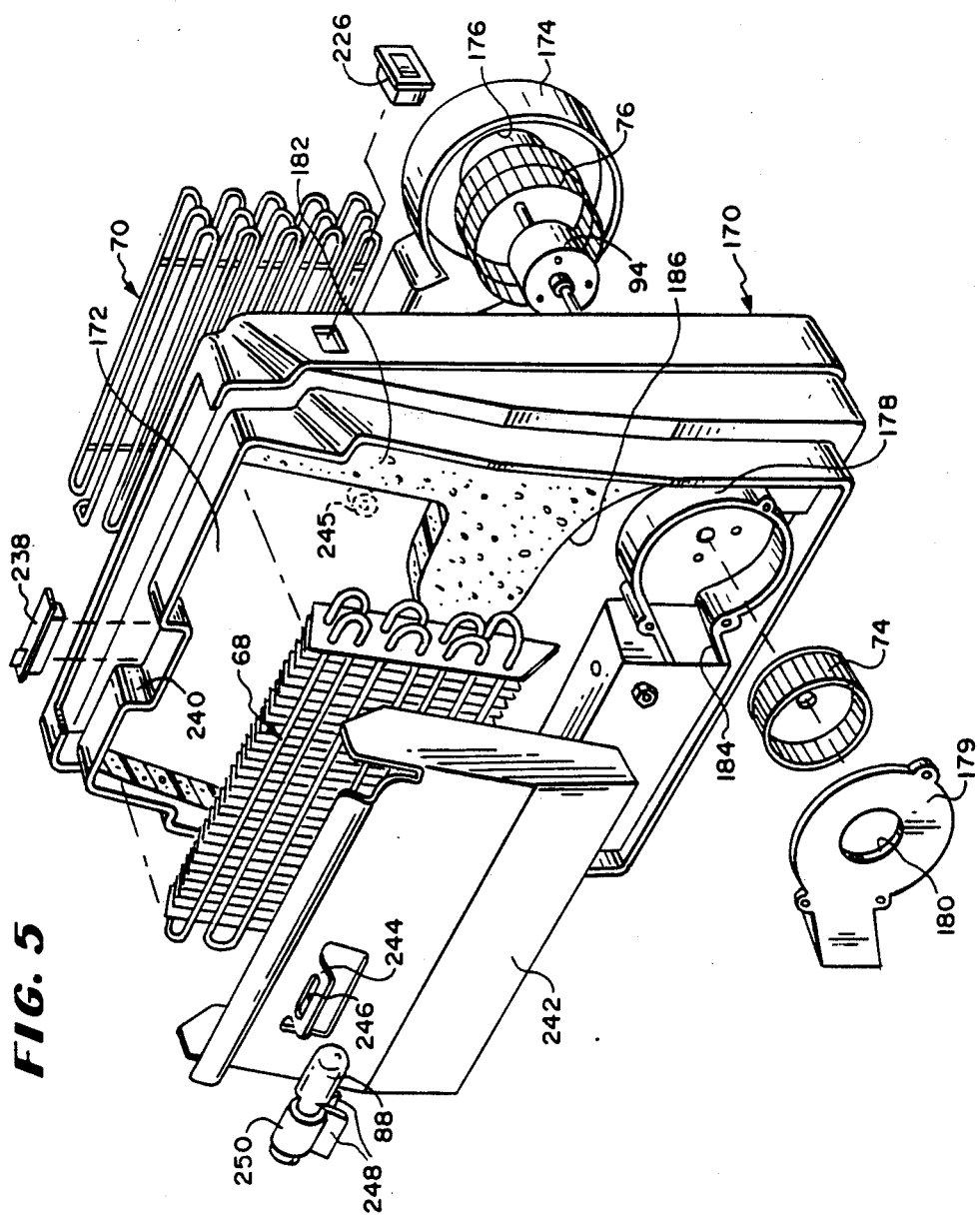
FIG. 5 is an exploded perspective view of the sealed refrigeration unit contained within one of the side walls of the freezer of FIG. 1.

In accordance with an important feature of the disclosed arrangement a second layer of foam insulation 182, which may be integral with the insulating layer 172, is shaped to surround the evaporator 68 and forms an air duct 186 (FIG. 7) which directs air, which has been pulled through the evaporator coils 68, into the opening 180 of the evaporator fan shroud 178. The fan 74 then directs this air through the outlet 184 of the shroud 178 and through the lower openings 80 in the inner wall 64 into the interior of the freezer 50. The foam layer 182 which forms the air duct 186 may be preformed and, thereafter, securely affixed, for example, by a suitable adhesive, to the divider wall 170 or may be molded in place or may be formed by the twin sheet thermoforming process discussed hereinafter as insulation formed in and assuming the configuration of an insulation cavity formed between and defined by the spaced apart interior surfaces of two spaced apart and interconnected plastic sheets, that is, the divider wall 170 and another plastic planar wall (not illustrated) at the outer planar surface of the foam layer 182 (as depicted in FIGS. 4, 5 and 7) and joined to the wall 170 during the twin sheet thermoforming process.

In accordance with a further important feature of the disclosed arrangement, means are provided for sensing when the side panel 60 has been assembled on the base panel 52, this sensing means being employed to prevent the mechanical refrigeration unit in the panel 60 from being turned on until it is properly mounted in a vertical position on the base panel 52. More particularly, a permanent magnet 190 (FIG. 4) is mounted in a recess 192 in the base panel 52 in the area which will be covered by the side panel 60 when it is assembled on the base 52, as best illustrated in FIGS. 2 and 4. A conventional reed switch 194 is mounted in the transverse bottom wall portion 196 of the divider wall 170 (FIG. 4) and is positioned so that when the panel 60 is mounted on the base 52 the reed switch 194 will be actuated by the permanent magnet 190. Reed switch 194 is connected in series with the main on/off power switch 198 (FIG. 3), which is mounted in the top wall of the panel 60, so that power cannot be applied to the panel 60 until it has been mounted on the base panel 52.

The outer wall 66 of the panel 60 is preferably formed by the twin sheet thermoforming process to provide the upper openings 84 in the wall 60 and the lower openings 82. The wall 66 also includes an upper hollow portion 200 which is uninsulated and is provided with a trough 202 in the top wall thereof which is adapted to receive the sealing gasket 98. Portion 200 is also provided with an inwardly extending wall 204 which is generally V-shaped and is adapted to receive the transverse upper end 206 of the divider wall 170, which is of a similar configuration, so that the upper ends of the outer wall 66 and the divider wall 170 may be joined by any suitable plastic sealing process. The bottom end of the outer wall 66 is also provided with a hollow portion 208 that provides rigidity for the bottom edge of the outer wall 66 and includes a shoulder 210 which is adapted to receive the transverse bottom wall portion 196 of the divider wall 170, as best illustrated in FIG. 4. The upper end of the inner wall 64 is secured to the top portion 206 of the divider wall 170 by any suitable heat sealing arrangement and the bottom wall portion 212 of the inner wall 64 extends beneath the transverse wall portion 196 of the divider 170 and is sealed thereto by any suitable heat sealing process so that side panel 60 is a completely sealed modular unit.

In order to provide a dual sealing arrangement for the bottom edge of the side panel 60 which is similar to the dual sealing gaskets described in detail heretofore in connection with the other side panels of the freezer 50, the base panel 52 is provided with the troughs 214 and 216 which are filled with either foam or solid gasket material, the trough 214 being positioned beneath the wall portion 212 of the inner wall 64 and the trough 216 being positioned beneath the bottom end of the outer wall 66. Downwardly extending ridges 218 and 220 are provided in the wall portion 212 and in the bottom edge of the outer wall 66 which are adapted to engage and compress the gasket material within the troughs 214 and 216, respectively, when the side panel 60 is mounted on the base panel 52. The vertical side wall portions of the inner wall 64 are provided with downwardly extending slots 222 and 224 (FIG. 3) which are adapted to engage corresponding tongues 223, 225 (FIG. 2) in the inner walls of the front and rear panels 54 and 56 so as to interlock these side wall portions with the front and rear panels in the manner described in detail heretofore in connection with installation of the side panel 58. The side panel 60 which contains the mechanical refrigeration unit described heretofore, can readily be assembled onto the base panel 52 after the front and rear walls 54 and 56 have been assembled thereto by engagement of the grooves 222 and 224 with their corresponding tongues 223, 225 on these front and rear walls. At the same time the ridges 218 and 220 engage the gaskets within the troughs 214 and 216 so that a seal is provided between the unit 60 and the base panel 52. The base panel 52 is also provided with grooves 227 (FIG. 2) in the area beneath the bottom edge of the panel 60 which are adapted to receive corresponding tongues (not shown) on the bottom edge of the panel 60 as the panel 60 is moved inwardly and downwardly onto the base 52. In order to seal the vertical edges of the panel 60 to the front and rear walls 54, 56 these edges are provided with gaskets which engage vertically extending limit shoulders 229 (FIG. 2) as the panel 60 is moved inwardly against these shoulders. The limit shoulders 229 correspond to the limit shoulders 138 (FIGS. 3 and 9) on the front and rear panels 54, 56 which limit inward movement of the side panel 58.

In accordance with a further important feature of the disclosed arrangement, a light source 226 (FIGS. 3 and 5) in the front wall of the divider panel 170 is positioned so that when the unit 60 is interconnected with the base 52 and front panel 54 the light source 226 directs light outwardly through an opening 228 in the front wall 54, as best illustrated in FIGS. 13 and 14. The opening 228 is provided with sloping side walls 230 to direct light through a smaller opening 232 in the remainder of the front panel 54 to a lens 234 which is mounted in the outer end of the light tube 232. Source 226 is arranged to be energized when the main power switch 198 is turned on so that a visual indication is provided to an outside observer during periods when the power is applied to the freezer 50. Preferably the lens 234 may be amber colored to provide a suitable indicating light that the mechanical refrigeration unit is turned on.

The controls for the side panel 60, which include the plunger type switch 90 for the access light 88 and the power on/off switch 198 are mounted on the upper wall portion 206 of the divider wall 170 and all of the electrical connections to these components are included within the panel unit 60. In addition, a multiposition slide type power level switch 236 (FIG. 3) is also mounted on the upper wall 206 of the divider wall 170 and cooperates with the thermostat 238 mounted in a recess 240 formed in the upper wall 206 to control the level of refrigeration within the freezer 50, in a manner readily apparent to those skilled in the art. An aluminum heat shield 242 (FIG. 5) is mounted on the divider wall 170 and surrounds the evaporator coils 68. The heat shield 242 is provided with an outwardly extending tab portion 244 having a slot 246 therein which is adapted to receive clip portions 248 of the light socket 250 for the lamp 88. If desired, a suitable calrod heating unit (not shown) may be positioned within the shield 242 and controlled by a timer 243 (FIG. 6) mounted on the divider wall 170 to provide an automatic defrost cycle in a conventional manner. An outlet tube 245, which is mounted on the divider wall 170, acts as a drain for water accumulated during the defrost cycle. The tube 245 may extend through a suitable opening (not shown) in the outer wall 66 of the panel 60. A terminal block 247 is also mounted on the divider wall 170 and is employed to establish the required electrical connections within the panel 60.

In accordance with a further important aspect of the disclosed arrangement, a plunger type switch 252 (FIG. 3) is mounted on the forward edge of the upper wall 206 of the side panel 60 and is employed to detect when the lid 62 of the freezer 50 has been left ajar. More particularly, the switch 252 is provided with a set of normally closed contacts 254 (FIG. 3A). The plunger type switch 90 at the back of the panel 60, which controls the access light 88, is also provided with a second set of normally opened contacts 256 which are connected in series with the contacts 254 to a power source 258. The relay coil of a time delay relay 260 is connected in series with the contacts 254 back to the other side of the power source 258. The relay contacts of the time delay relay 260 are arranged to energize an alarm 262 in the event that both of the sets of contacts 254 and 256 are closed and the time delay established by the relay 260 has expired. When the lid 62 is open, the contacts 254 and 256 have the position shown in FIG. 3A. When the lid 62 is closed the contacts 256 are always closed because of the proximity of the switch 90 to the hinge edge of the lid 62. However, since the switch 252 is mounted near the front edge of the lid 62 the contacts 254 of the switch 252 may not be opened unless the lid is closed sufficiently to actuate the switch 252. Accordingly, if the lid 62 is left slightly ajar by an amount such that the plunger of the switch 252 is not depressed a sufficient amount to open the contacts 254 of the switch 252, the relay 260 is energized and, after the predetermined delay established by the relay 260 has expired, the alarm 262 (FIG. 3A) is energized. The alarm 262 may either be an audible alarm or a flashing of the light source 226 which is visible through the front panel 54 of the freezer 50 (FIG. 3B) as described in detail heretofore. The arrangement of FIG. 3A thus provides an audible or visual indication to the user that lid 62 of the freezer 50 has not been tightly closed, i.e., by an amount sufficient to open the contacts 254 of the switch 252.

If desired, an alternative arrangement may be provided for detecting when the lid 62 has been left ajar. Referring to FIG. 3B, a differential pressure switch 264 may be provided with the normally closed contacts 266 which are opened when a predetermined pressure differential is established between the inside of the freezer 50 and the exterior thereof. When the lid 62 of the freezer 50 is open, warm air enters the freezing compartment; and, after the lid is closed again, it takes several seconds to reestablish a vacuum, i.e., to provide a lower pressure within the freezing compartment of the freezer 50. During periods when the lid 62 is opened, the contacts 266 of the pressure differential switch 264 are closed because the pressure within the freezer 50 is the same as exterior air pressure. However, if the lid 62 is tightly closed, the pressure is soon reduced within the freezing compartment of the freezer 50 and the contacts 266 open. If this occurs before the end of the time delay established by the time delay relay 260, the alarm 262 is not energized. However, if the lid 62 has been left ajar, the contacts 266 will not be opened and an alarm will be given at the end of the delay established by the relay 260. In other respects the circuit arrangement of FIG. 3B is identical to that described heretofore in connection with FIG. 3A. The pressure differential switch 264 may, for example, be mounted on the divider wall 170 at a point where one side of the switch is exposed to exterior or ambient air, the other side of this switch 264 communicating with the interior of the freezer 50 through a suitable sensing tube.

Forming Freezer Panels By Twin Sheet Thermoforming Process

As discussed generally heretofore, the base panel 52 and the side panels 54, 56 and 58, and the lid 62 are all preferably formed by employing a twin sheet thermoforming process. Such a process is believed to be old, per se, in fields other than the domestic or household appliance field. However, applicants believe they are the first to use such a process in domestic or home appliances, particularly where thermal conductivity through the panel is important, as in the illustrated chest freezer 50.

Referring now to FIGS. 15-19 wherein the individual steps of the twin sheet thermoforming process of the disclosed arrangement are illustrated diagrammatically, first and second sheets of plastic material 270 and 272 are extruded from the extrusion head 274 and are immediately positioned between two opposed open die members 276 and 278 of a die thermoforming fixture, the die members 276, 278 having formed on the internal surfaces thereof the desired configuration of the inner and outer walls of the final panels. The die members 276 and 278 are then closed to the position shown in FIG. 16 and air is admitted into the space 280 between the opposed sheet portions 270a and 272a so that these plastic sheets are forced outwardly into the internal surfaces of the die members 276 and 278 to form the desired shape of the final panel. In the alternative, the plastic sheets 270a and 272a may be sucked outwardly against the internal surfaces of the die members 276 and 278 by applying a suitable vacuum through holes in the die members.

Figure 16:
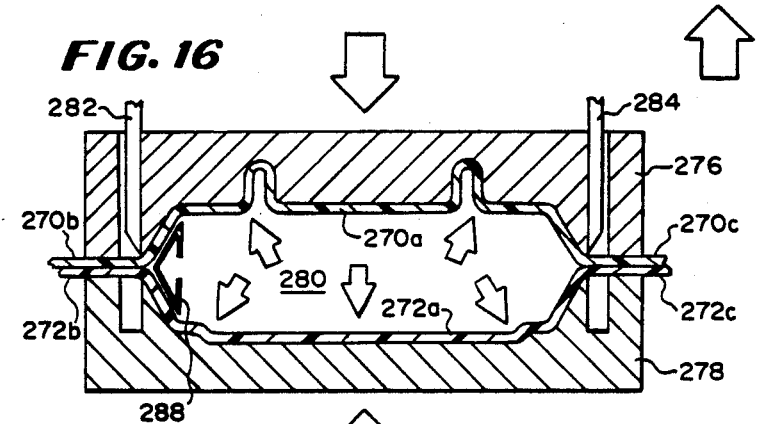
Figure 17:
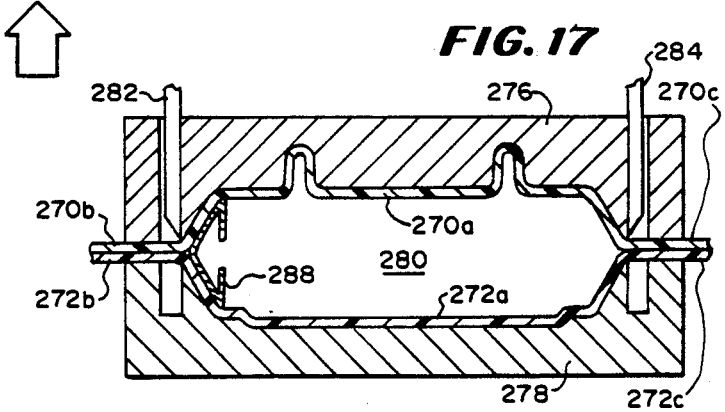
Figure 18:
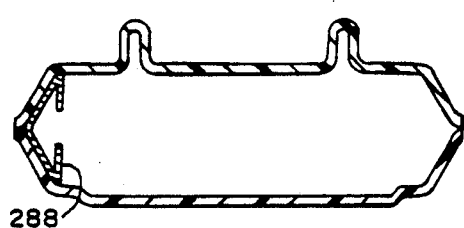

When the die members 276 and 278 are closed, the edges 270b and 270c of the sheet 270a are sealed with the edges 272b and 272c of the sheet portion 272a to form a completely sealed hollow panel, as shown in FIG. 16. The knives 282 and 284, which are mounted in the upper die member 276, are then moved downwardly to trim the edge portions 270b, 270c and 272b, 272c from the hollow panel so as to provide the finished panel indicated in FIG. 18. The sheets 270 and 272 may be of any suitable plastic material, for example, a polyvinylchloride, an acrylonitrile butadiene styrene (ABS) polymer or a high impact polystyrene.

Figure 19:
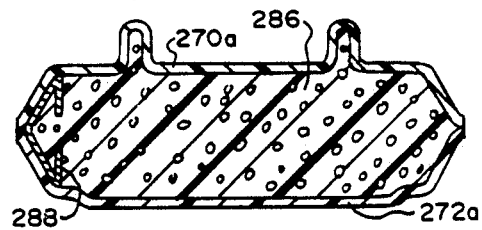

When the thermal conductivity through the panel side walls is important, the space 280 between these side walls may be filled with an insulating material 286 (FIG. 19). In such case, the die thermoforming fixture 276, 278 is moved to a foam machine where foam insulation is introduced preferably while the side walls 270a and 272a are positioned within the die members 276 and 278, this foam insulation being introduced through a suitable opening in one of the die members. The insulation may be foamed in place while the side panels 270a and 272a are supported by the internal surfaces of the die members 276 and 278 so that the side panels are prevented from being deformed while the foam insulation is being introduced. In the alternative, the insulating material 286 may comprise a rigid insulation panel which is introduced between the sheets 270 and 272 before the die members 276 and 278 are closed. This rigid insulation panel may comprise polystyrene bead board which under pressure and temperature expands to fill the space 280 between the side walls 270a and 272a.

In accordance with a further important aspect of the twin sheet thermoforming process of the disclosed arrangement, one or more inserts, which may be of metal or other rigid material, may be provided between the inner and outer sheets 270a and 272a to provide rigidity or stiffness in desired areas of the panel or to provide a suitable metal insert which can be used for mounting components, such as hinges, to the final panel. For example, the triangularly-shaped metal insert 288 (FIG. 15) may be positioned between the twin plastic sheets 270 and 272 while they are spaced apart between the open die members 276 and 278 when the die thermoforming fixture is closed to the position shown in FIG. 16. The insert 288 is then positioned adjacent one end wall of the space 280 between the panel sheets 270a and 272a.

Utilization of the above-described twin sheet thermoforming process in forming either hollow or insulated panels suitable for use in the domestic or home appliance field has many advantages, particularly when such process is used to manufacture the base lid and side panels of the illustrated chest freezer 50. Thus, the base panel 52 and the side panels 54, 56 and 58 may be manufactured in one operation while providing all of the above-described complex interlocking surfaces, gasket ridges and troughs, and, if desired, foamed gasket insulation as well. By utilizing the described process, light weight, rigid panels having the desired thermal insulation and yet including the complex interlocking surfaces required for assembling these panels together in the manner described in detail heretofore, may be provided by means of the die members 276 and 278. Furthermore, this single manufacturing operation can also provide the basket supporting ledges 275 and 277 on the front and rear panels 54 and 56, the top grooves 98a and 202 for the gasket 98, the ornamental trim corrugations 279 on the upper portions of the outer walls of the panels 54-60, and the ridges 281 on the base panel 52 which provide air passages between the food and the floor of the freezer compartment and promote a more uniform temperature within the freezer 50. Accordingly, the total number of parts is greatly reduced and secondary operations such as welding, painting and sealing may be eliminated.

The plastic sheets 270 and 272 may also be of different plastic materials in situations where plastic material having one set of characteristics is desired for the outer wall of the panel, and a plastic material having different characteristics is desired for use as the inner wall of the panel. For example, a rigid, high impact plastic material may be used for the outer wall of the panel, whereas a smoother or softer plastic material, which is easy to clean, may be used for the inner wall of the panel. In addition, the plastic sheets 270 and 272 may comprise plastic materials of different colors where a particular color is required for the outside of the freezer and a different color for the interior of the freezer. Also, these sheets of plastic of different colors may have different physical characteristics, as described above, if desired. Furthermore, the entire exterior of the freezer 50 is non-corrosive since it is formed by the outer walls of the twin sheet thermoformed panels which are of plastic material.

The described twin sheet thermoforming process particularly lends itself to the provision of foam insulation between the side walls of the panel which may be foamed in place, preferably the plastic sheets are backed up by the die members 276 and 278, as described heretofore. In addition, the provision of metal inserts which are incorporated while the panel is being formed is particularly desirable for mounting components on the finished panel during the manufacturing process and before the panel is shipped to its final destination for assembly.

One example of the use of such inserts is shown in connection with the provision of hinges for the lid 62, as shown in detail in FIGS. 20 and 21. Referring to these figures, the metal insert 296 is provided along the rear edge of the lid 62, the insert 296 being positioned between the side walls 62a and 62b of the panel 62 while this panel is being formed and the insulation 62c foamed in place therebetween so that the insert 296 is rigidly held in place within the lid 62. Bottom wall 62b of the lid 62 is also provided with the trough 298 (FIG. 20) around the periphery thereof which is adapted to receive the upper sealing gasket 300 which cooperates with the gasket 98 provided in the top grooves of the side walls of the freezer 50 to provide a tight seal around the perimeter of the lid 62. A pair of upper hinge brackets 302 are mounted on the rear edge of the panel 62 by means of the bolts 304. A hinge pin 306 is positioned between the side walls of the upper hinge bracket 302 and extends outwardly therefrom to pivotally mount the upper flange portions 308 of a pair of lower hinge brackets indicated generally at 310.

In order to provide a simple mounting arrangement for securing the lower hinge brackets 310 to the upper edge of the rear panel 56 of the freezer 50, a metal insert indicated generally at 312 is positioned between the side walls 56a and 56b of the rear panel 56 while the panel 56 is being formed and before the insulation 56c has been added. Accordingly, the insert 312 is rigidly held in place along the upper edge of the panel 56 and may have the nuts 314 secured to the inner surface of the back wall 316 of the insert 312. All that is then required to mount the lid 62 on the rear panel 56 is to insert the bolts 318 through the openings 320 in the outer wall 322 of the lower bracket 310 and to thread these bolts into the nuts 314 on the metal insert 312. Preferably, the openings 320 in the outer bracket wall 322 are elongated to provide slots so that the lid 62 may be leveled on the upper edge of the rear panel 56 as it is assembled thereto.

In order to provide an arrangement for biasing the lid 62 upwardly to facilitate opening thereof and to hold it in an upper open position, a pair of U-shaped members 324 are slidably mounted over a rod 326 which extends between the side walls of the lower hinge bracket 310, the upper ends of the U-shaped members 324 engaging a pin 327 which extends between the side walls of the upper bracket 302 when the upper and lower brackets 302 and 310 are assembled together. A coil spring 328 is positioned around each of the U-shaped members 324 and extends between outwardly extending flanges 330 and 332 provided along the length of the U-shaped member 324. When the lid 62 has the closed position shown in FIG. 20, the springs 328 are compressed. Since the pin 327 is offset relative to the hinge pin 306, the spring 328 facilitates lifting of the lid 62 to the upper position shown in FIG. 21. When the lid 62 is in the position shown in FIG. 21, the springs 328 are fully extended and provide sufficient force to hold the lid 62 in the open position. It should be noted that all of the hinge parts may be assembled to the lid 62 before the lid is shipped to the point of assembly. Accordingly, all that is required in assembling the lid 62 onto the rear wall 58 is inserting the bolts 318 into the nuts 314 while the lid 62 is resting on the gasket 98.

Obviously, many modifications and variations of the present invention are possible in light of the above teachings. Accordingly, it is to be understood that, within the scope of the appended claims, the invention may be practiced otherwise than as specifically described hereinabove.

What is claimed and desired to be secured by Letters Patent is:

1. A knockdown domestic appliance unit comprising a plurality of side panels and a base panel, said base panel and said side panels having in the edges thereof cooperating integral means for interlocking said panels together, whereby said side panels may be readily assembled to said base panel and to each other by simple engagement of said interlocking means in said panel edges without the use of tools or separate fastening means, said interlocking means including elongated slots in said base panel which extend inwardly and downwardly therein at an angle to the vertical, and projecting tongues on the bottom edges of said side panels which extend into said slots, and cooperating interlocking shoulders on said side panels and said base panel which are engaged as said tongues are inserted into said slots, said interlocking shoulders being positioned between said slots on said base member and between said tongues on said side panels.

2. A knockdown domestic appliance unit comprising a plurality of side panels and a base panel, said base panel and said side panels having in the edges thereof cooperating integral means for interlocking said panels together, whereby said side panels may be readily assembled to said base panel and to each other by simple engagement of said interlocking means in said panel edges without the use of tools or separate fastening means, said interlocking means including elongated slots in said base panel which extend inwardly and downwardly therein at an angle to the vertical, and projecting tongues on the bottom edges of said side panels which extend into said slots, adjacent ones of said side panels have cooperating tongue and groove surfaces in the meeting edges thereof which are engaged as said projecting tongues are inserted into said slots.

3. A domestic appliance unit as set forth in claim 2 wherein said tongue and groove surfaces extend inwardly and downwardly along a line which is generally parallel to said slots in said base panel.

4. A domestic appliance unit as set forth in claim 2 wherein one of said adjacent side panels has a limit shoulder in the edge thereof which cooperates with a shoulder on the other adjacent side panel to limit inward movement of said other adjacent side panel during assembly.

5. A domestic appliance unit as set forth in claim 2 which includes first vertically extending grooves positioned inside said tongue and groove surfaces on opposed ones of said side panels and containing first sealing gaskets for providing a first seal between adjacent ones of said side walls.

6. A domestic appliance unit as set forth in claim 5 which includes vertically extending ridges in the edges of the side panels adjacent said opposed side panels, said ridges being positioned to engage and compress said first sealing gaskets when adjacent side panels are assembled together.

7. A domestic appliance unit as set forth in claim 5 which includes second vertically extending grooves positioned outside said first vertically extending grooves in said opposed ones of said side panels and interrupted by said tongue and groove surfaces, said second grooves containing second sealing gaskets for providing a second seal between adjacent ones of said side panels.

8. A domestic appliance unit as set forth in claim 7 which includes vertically extending projections in the edges of the side panels adjacent said opposed side panels, said projections being positioned to engage and interlock with the outer edges of said second vertically extending grooves, thereby to hold adjacent side panels securely together.

9. A domestic appliance unit as set forth in claim 8 wherein said projections also engage and compress said second sealing gaskets when said projections are interlocked with said outer edges of said second vertically extending grooves.

10. A domestic appliance unit as set forth in claim 8 which includes projecting ridges formed in said outer edges of said second vertically extending grooves, said ridges being adapted to engage and interlock with said vertically extending projections.

11. A knockdown domestic appliance unit comprising a plurality of side panels and a base panel, said base panel and said side panels having in the edges thereof cooperating integral means for interlocking said panels together, whereby said side panels may be readily assembled to said base panel and to each other by simple engagement of said interlocking means in said panel edges without the use of tools or separate fastening means, said interlocking means including elongated slots in said base panel which extend inwardly and downwardly therein at an angle to the vertical, and projecting tongues on the bottom edges of said side panels which extend into said slots, and cooperating interlocking shoulders on said side panels and said base panel which are engaged as said tongues are inserted into said slots, said base panel being provided with an inwardly offset portion positioned above said slots for limiting inward and downward movement of said tongues into said slots.

12. A domestic appliance unit as set forth in claim 11 wherein said interlocking shoulders on said base panel are positioned in the vertical wall of said offset portion.

13. A domestic appliance unit as set forth in claim 12 wherein said slots are spaced apart along the edges of said base panel and said base panel interlocking shoulders are positioned between said slots.

14. A domestic appliance unit as set forth in claim 11 further including a groove in the upper surface of said offset portion of said base panel, said groove containing a sealing gasket for providing a seal between said base panel and said side panels.

15. A domestic appliance unit as set forth in claim 14 further including downwardly projecting ridges in the bottom edges of said side panels, said ridges being positioned to engage and compress said sealing gasket when said projecting tongues are inserted into said slots.

16. A domestic appliance unit as set forth in claim 15 further including a second groove in said base panel which is positioned between said slots and the outer edge of said base panel, said second groove containing a second sealing gasket for providing a second seal between said base panel and said side panels.

17. A domestic appliance unit as set forth in claim 16 further including second downwardly projecting ridges in the bottom edges of said side panels, said second ridges being positioned to engage and compress said second sealing gasket when said projecting tongues are inserted into said slots.

18. A knockdown domestic appliance unit comprising a plurality of side panels and a base panel, said base panel and said side panels having in the edges thereof cooperating integral means for interlocking said panels together, whereby said side panels may be readily assembled to said base panel and to each other by simple engagement of said interlocking means in said panel edges without the use of tools or separate fastening means, said interlocking means including elongated slots in said base panel which extend inwardly and downwardly therein at an angle to the vertical, and projecting tongues on the bottom edges of said side panels which extend into said slots, and a groove in said base panel which is positioned between said slots and the outer edge of said base panel, said groove containing a sealing gasket for providing a seal between said base panel and said side panels.

19. A domestic appliance unit as set forth in claim 18 further including downwardly projecting ridges in the bottom edges of said side panels, said ridges being positioned to engage and compress said sealing gasket when said projecting tongues are inserted into said slots.

20. A knockdown domestic appliance unit comprising a plurality of side panels and a base panel, said base panel and said side panels having in the edges thereof cooperating integral means for interlocking said panels together, whereby said side panels may be readily assembled to said base panel and to each other by simple engagement of said interlocking means in said panel edges without the use of tools or separate fastening means, said interlocking means including elongated slots in said base panel which extend inwardly and downwardly therein at an angle to the vertical, and projecting tongues on the bottom edges of said side panels which extend into said slots, and gaskets mounted in the upper surface of said base panel and positioned on either side of said slots, said gaskets being engaged by the bottom edges of said side panels as said projecting tongues are inserted into said slots, thereby to provide dual seals between said base panel and said side panels.

21. A domestic appliance unit as set forth in claim 20 further including downwardly extending ridges on the bottom edges of said side panels which are positioned to engage and compress said gaskets when said side panels are mounted on said base panel.

22. A domestic appliance unit as recited in claim 20 wherein said gaskets are foamed urethane.

23. A domestic appliance unit as recited in claim 20 therein said gaskets are foamed silicone.

24. A domestic appliance unit as recited in claim 20 wherein said gaskets are solid silicone.

25. A domestic appliance unit as recited in claim 20 wherein said gaskets are solid vinyl.

26. A domestic appliance unit as recited in claim 20 wherein said gaskets are solid rubber.

27. A knockdown refrigeration appliance comprising a plurality of side panels and a base panel, each of said side and base panels comprising inner and outer sheets of plastic material separated by a layer of insulating material and each provided in the edges thereof with cooperating integral means for interlocking said panels together, whereby said side panels may be readily assembled to said base panel and to each other by simple engagement of said interlocking means in said panel edges without the use of tools or separate fastening means, aid interlocking means include elongated locating tabs which extend along the bottom edges of said side panels and project inwardly and downwardly therefrom at an angle to the vertical, and elongated openings in the edges of said base panel which are adapted to receive said locating tabs as said side panels are moved inwardly and downwardly relative to said base panel at said angle to the vertical.

28. A knockdown refrigeration appliance according to claim 27 including cooperating interlocking shoulders on said side panels and said base panel which are engaged as said locating tabs are moved into said elongated openings.

29. A knockdown refrigeration appliance according to claim 27 which includes gaskets mounted in the upper surface of said base panel and positioned on either side of said elongated openings, said gaskets being engaged by the bottom edges of said side panels as said locating tabs are inserted into said openings thereby to provide dual seals between said base panel and said side panels.

30. A knockdown refrigeration appliance according to claim 29 further including downwardly extending ridges on the bottom edges of said side panels which are positioned to engage and compress said gaskets when said side panels are mounted on said base panel.

31. A knockdown refrigeration appliance according to claim 29 wherein said gaskets comprise gasket material which is deposited in troughs formed in the upper surface of said base panel.

32. A knockdown refrigeration appliance according to claim 31 wherein in said gasket material is foamed in place at the time said insulating material is provided between said inner and outer sheets of said base panel.

33. A knockdown refrigeration appliance according to claim 31 wherein said gasket material is deposited at the time said insulating material is provided between said inner and outer sheets of said base panel.

34. A knockdown refrigeration appliance according to claim 33 wherein said gasket material is foamed urethane.

35. A knockdown refrigeration appliance according to claim 33 wherein said gasket material is foamed silicone.

36. A knockdown refrigeration appliance according to claim 34 wherein said gasket material is solid vinyl.

37. A knockdown refrigeration appliance according to claim 34 wherein said gasket material is solid vinyl.

38. A knockdown refrigeration appliance according to claim 33 wherein said gasket material is solid rubber.

39. A knockdown domestic appliance unit comprising a plurality of side panels and a base panel, said base panel and said side panels having in the edges thereof cooperating integral means for interlocking said panels together, whereby said side panels may be readily assembled to said base panel and to each other by simple engagement of said interlocking means in said panel edges without the use of tools or separate fastening means, said interlocking means including elongated slots in said base panel which extend inwardly and downwardly therein at an angle to the vertical, and projecting tongues on the bottom edges of said side panels which extend into said slots.

40. A domestic appliance unit according to claim 39 further including cooperating interlocking shoulders on said side panels and said base panel which are engaged as said tongues are inserted into said slots.

* * * * *